United States Patent [19]

Famili et al.

[11] Patent Number: 5,362,532
[45] Date of Patent: Nov. 8, 1994

[54] WATER SOLUBLE MULTILAYER FILM FOR PACKAGING ALKALINE MATERIALS

[75] Inventors: Amir Famili, Schnecksville; F. Lennart Marten, Macungie; James F. Nangeroni, Allentown, all of Pa.

[73] Assignee: Air Products and Chemicals, Inc., Allentown, Pa.

[21] Appl. No.: 37,060

[22] Filed: Mar. 25, 1993

Related U.S. Application Data

[63] Continuation of Ser. No. 703,429, May 17, 1991, abandoned.

[51] Int. Cl.$^5$ ................................................. B32B 1/08
[52] U.S. Cl. ................................ 428/36.6; 428/522; 428/36.7; 428/520; 428/515
[58] Field of Search ............... 428/36.7, 35.4, 520, 428/515

[56] References Cited

U.S. PATENT DOCUMENTS

| | | | |
|---|---|---|---|
| 3,790,067 | 2/1974 | Scheier | 229/55 |
| 4,254,169 | 3/1981 | Schroeder | 428/35 |
| 4,348,293 | 9/1982 | Clarke et al. | 252/90 |
| 4,481,326 | 11/1984 | Sonenstein | 525/57 |
| 4,551,369 | 11/1985 | Belz | 428/36 |
| 4,612,355 | 9/1986 | Belz | 526/65 |
| 4,870,148 | 9/1989 | Belz | 526/318.41 |
| 4,883,105 | 12/1989 | Yang et al. | 525/60 |
| 5,108,807 | 4/1992 | Tucker | 428/35.2 |

FOREIGN PATENT DOCUMENTS

| | | |
|---|---|---|
| 0284191 | 4/1990 | European Pat. Off. . |
| 0457600 | 11/1991 | European Pat. Off. . |
| 62060644 | 9/1985 | Japan . |
| 02108534 | 4/1990 | Japan . |
| 3124734 | 5/1991 | Japan . |
| 4037539 | 2/1992 | Japan . |
| 1384791 | 5/1992 | United Kingdom . |

*Primary Examiner*—Edith Buffalow
*Attorney, Agent, or Firm*—Michael Leach; William F. Marsh

[57] ABSTRACT

A multilayer structure, especially a multilayer film, for packaging alkaline, or caustic, compositions. The multilayer structure consists essentially of:

(1) a first layer of an acid functional polymer that is soluble in aqueous alkaline medium,
(2) a second layer of a partially hydrolyzed, thermoplastic PVOH, and, optionally,
(3) a third layer of a fully hydrolyzed, thermoplastic PVOH.

29 Claims, No Drawings

WATER SOLUBLE MULTILAYER FILM FOR PACKAGING ALKALINE MATERIALS

This is a continuation of application Ser. No. 07/703,429 filed May 17, 1991 now abandoned.

TECHNICAL FIELD

The present Invention relates to multilayer polymeric structures, particularly multilayer polymeric films containing a polyvinyl alcohol (PVOH) layer.

BACKGROUND OF THE INVENTION

Many common chemicals that are used by dispersing or dissolving in water are initially produced and packaged In powdered form. Examples of water dispersed or dissolved chemicals are agricultural chemicals such as pesticides which are applied as a water spray, caustic cleaners and detergents, and process chemicals such as pigments, dyes and carbon black.

There are, however, several problems associated with the use of these products due to their toxicity or high concentration. Such problems include accidental exposure of the user or the immediate environment to the chemicals, accuracy in measurement during the addition of the chemical to water tanks, and, finally, the disposal of the package in which the chemicals were delivered.

For the above reasons there has been a keen interest in packaging water soluble or water dispersible chemicals In water soluble films. Such packages would have the following advantages: human contact with the concentrated chemical would be eliminated, accurate dosages of the chemicals would be assured, and the disposal problem would be eliminated.

While there are water soluble PVOH films available for packaging materials, such PVOH films typically lack the alkaline stability necessary for packaging alkaline, or caustic, compositions such as cleaning products and detergents. Typically, a partially hydrolyzed PVOH is used to produce the cold water soluble film for packaging the alkaline product. However, the partially hydrolyzed PVOH being in contact with the alkaline product will undergo further hydrolysis reaction to produce a fully hydrolyzed PVOH film.

This fully hydrolyzed film has two major drawbacks. First, due to an increase in the overall degree of hydrolysis of the PVOH, the film becomes cold water insoluble. Secondly, a fully hydrolyzed PVOH film is highly crystalline. This highly crystalline film is more brittle and subject to cracking at low humidity which may result in accidental spillage of the chemicals and contamination of both humans and the environment.

Many attempts have been reported to improve the pH stability of the PVOH films. These efforts have included the selection of a special plasticizer: U.S. Pat. No. 2,948,697; 3,106,543 and 3,157,611; or blending PVOH with an alkaline, stable water soluble polymer such as disclosed in U.S. Pat. No. 2,850,741; 3,695,989; 3,892,905; 4,481,326 and 4,692,494. Other approaches to producing a pH stable PVOH have been directed at the modification or copolymerization of polyvinyl alcohol as disclosed in U.S. Pat. No. 3,441,547; 3,505,303; 4,747,976 and 4,844,828.

U.S. Pat. No. 4,692,494 discloses water soluble films of polyvinyl alcohol and polyacrylic acid and packages comprising same.

In addition to PVOH films, there are alkaline water soluble, acid functional resins which Include copolymers of (meth)acrylates and (meth)acrylic acid offered by Belland AG under the trademark BELLAND 2620 and 2585. However, these films either lack tensile strength or are very brittle and crack at low temperatures and relative humidity.

EP 0 415 357 A discloses a method for producing thermoplastic PVOH compositions.

SUMMARY OF THE INVENTION

The present invention provides a multilayer structure, especially a multilayer film, for packaging alkaline, or caustic, compositions. The multilayer structure consists essentially of:

(1) a first layer of an acid functional polymer that is soluble in aqueous alkaline medium, (2) a second layer of a partially hydrolyzed, thermoplastic PVOH, and, optionally, (3) a third layer of a fully hydrolyzed, thermoplastic PVOH.

The first layer is in contact with the alkaline composition of the package.

The multilayer structure thus provides a cold water soluble package when it comprises two layers, the outer layer being the partially hydrolyzed PVOH, and a hot water soluble package when it comprises three layers, the outer layer being the fully hydrolyzed PVOH. The structure may be any article that is suitable for at least partially enclosing the caustic materials such as containers, pouches, envelopes, bottles and the like.

Moreover, the water soluble layers as films are transparent, non-tacky, heat sealable, thermoformable and mechanically strong. The multilayer structure is stable during storage over a wide range of temperatures and humidity. Since the alkaline contents of the package is in contact with the first layer and not the partially hydrolyzed PVOH, an alkaline stable, self-supporting packaging structure is obtained.

DETAILED DESCRIPTION OF THE INVENTION

The invention provides a water soluble, multilayer film especially suited for packaging pulverulent, powdery or solid caustic chemicals which are to be dissolved or dispersed in an aqueous medium in their application. The film consists essentially of:

(1) a first, or inner, layer of a water insoluble acid functional polymer which is, however, soluble in a basic, aqueous medium;

(2) a second layer of a cold water soluble, partially hydrolyzed, thermoplastic PVOH, and, optionally, (3) a third, or outer, layer of warm water soluble, fully hydrolyzed thermoplastic PVOH.

The thickness of each layer could vary between 0.5 to 5 mils depending upon the end use application. The surfaces of the individual layers are heat sealable to each other, for example, along their common edges or over all or part of their adjacent surfaces.

The inner layer which is insoluble in neutral aqueous media, but soluble in a basic aqueous medium, comprises an acid functional polymer. "functional" means the polymer contains pendant carboxylic ($-CO_2H$) or sulfonic ($-SO_3H$) acid groups. Polymers that may be suitably used include those copolymers or terpolymers of $C_1-C_8$ alkyl (meth)acrylates and (meth)acrylic acid from Belland AG under the trademark BELLAND 2620 and 2585 such as, for example, butyl methacrylate/ethyl acrylate/methacrylic acid terpolymers. U.S. Pat. No. 4,612,355 teaches a method for making such alkyl (meth)acrylate/-(meth)acrylic acid copolymers which is incorporated by reference. The Belland resins can be processed on typical plastic processing equipment such as a polyethylene screw with a 2.5:1 compression ratio, square pitch and 24" (61 cm) diameter long. Start-up conditions on the barrel are typically 130°–155° C. while maintaining the melt below 160° C.

Also suitable as the resin for the first layer are ethylene-acrylic acid copolymers, for example having 20% acrylic acid, sold under the trademark Primacor by Dow Chemical Co. or styrene-maleic anhydride copolymers available from Monsanto Co. and Arco Chemical Co. The purpose of this first layer is to protect the second, or partially hydrolyzed PVOH, layer from direct contact with the alkaline contents in order to maintain the cold water solubility and flexibility of the partially hydrolyzed PVOH layer. The problem of hydrolysis to fully hydrolyzed PVOH is avoided. This first layer also provides a film whose performance Is not affected over a wide range of temperature and humidity.

The second layer consists essentially of a partially hydrolyzed thermoplastic PVOH film. Suitable PVOH's for this second layer are those which are 75 to 90 mole %, preferably 86–89 mole %, hydrolyzed and have a degree of polymerization (DPn) in the range of 200 to 2,500, i.e., viscosities of 2 to 30 cps at 20° C. as 4% aqueous solutions. Also suitable are vinyl alcohol copolymers which contain methyl methacrylate as disclosed in U.S. Pat. No. 3,689,469 or copolymers containing up to 3–4 mole % other copolymerized monomer.

The second, or partially hydrolyzed PVOH, layer acts as a support film for the inner layer, thus eliminating the cracking of the acid functional polymer layer. It also provides structural integrity and flexibility to the package and provides for cold water solubility.

Optionally, but preferably, a third layer of a cold water insoluble (warm water soluble) PVOH film can be incorporated into the structure to reduce the tackiness of the film and premature disintegration of the package during handling in a wet environment, e.g., handling the package with a wet hand. This third layer also minimizes the effect of high humidity on the film structure. But most importantly, this third layer provides a warm water soluble film which would lead to the disintegration of the packaging only in an application that utilizes warm or hot water, not cold water. "Warm water" is intended to mean water that is at least 60° C.

The suitable resin composition for this third layer is a PVOH which is 95–99+ mole % hydrolyzed, preferably 98–99 mole % hydrolyzed, and possesses a degree of polymerization In the range of 200 to 2,500.

Since the preferred method of producing the multilayer structure is by direct co-extrusion of the resins using cast or blown film processes well known in the art of melt extruding resins, the PVOH resins used for the second and third layers must be melt extrudable, thermoplastic compositions. U.S. patent application Ser. No. 07/402,167 filed Sep. 1, 1989 discloses a method for producing such melt extrudable PVOH compositions, which application is incorporated by reference. Suitable melt extrudable PVOH compositions are marketed by Air Products and Chemicals, Inc. under the trademark VINEX and can be used directly in the co-extruder.

Vinex PVOH resins can be processed on typical plastic processing equipment such as a polyethylene screw with a 2.5:1 compression ratio, square pitch and 24" (61 cm) diameter long. Start-up conditions on the barrel are typically 195°–220° C. while maintaining the melt below 2250° C.

Alternatively, the thermoplastic PVOH composition can be generated inside the co-extruder itself by using a commercial grade PVOH and following the teachings of the 402,167 patent application. To generate the melt extrudable PVOH compositions in situ, a suitable plasticizer would be blended with the appropriate PVOH. Such plasticizer would be compatible with the PVOH and may be a polyhydric alcohol, most preferably glycerol, polyethylene glycol or other hydrophilic compounds known in the art to possess compatibility with PVOH. Suitable hydrophilic plasticizers include ethylene glycol, diethylene glycol, trimethyol propane, mannitol, pentaerythritol or other polyhydric low molecular weight alcohols, block of polymers of ethylene oxide and propylene oxide, non-hydroxylic plasticizers such as aromatic amides and aromatic sulfonamides and are added to the composition in amounts ranging from 1–30 wt %, preferably 3–20 wt %, based on PVOH.

The thermal stability of the PVOH can be further improved through the addition of a small amount of a mineral acid, preferably phosphoric acid, to the PVOH and plasticizer blend prior to extrusion or by removing the residual ash (sodium acetate measured as $Na_2O$) through washing with an appropriate solvent. Optionally, but advantageously, a dispersing agent such as glycerol mono-oleate (GMO) is added during the blending operation to reduce lumping.

The multilayer structure can be constructed either by extruding a single layer film of each polymer composition and then heat laminating the films together using equipment well known In the art for this purpose or by co-extruding the thermoplastic PVOH resins together using a blown or cast extrusion process and then heat laminating the acid functional resin to the partially hydrolyzed PVOH layer. The most preferred way of producing the multilayer structure is by direct co-extrusion of the three resins using a cast or blown film process and heat lamination (the hot extruded films being pressed together).

A multilayer film of this invention is water soluble, transparent, tough, flexible, caustic resistant, heat sealable, thermoformable and stable during storage over a wide range of temperature. The thickness of each layer could vary between 0.5 to 5 mils preferably between 1 to 3 mils depending upon the end use application.

Three layered pouches are not tacky to the wet hand and can be dissolved completely in warm alkaline water. However, if a cold water soluble caustic resistant film is required for packaging chemicals such as laundry detergent in which rapid dispensing of the detergent is required at the beginning of the wash cycle, the two-layered pouch comprising the acid functional polymer inner layer and the partially hydrolyzed thermoplastic PVOH outer layer is more suitable.

EXAMPLE 1

Vinex 2034 resin, a 87–89 mole % hydrolyzed thermoplastic PVOH having a DPn of 650, was extrusion cast into a film under the following conditions in a 1 inch (2.54 cm) diameter, 24:1 L/D Killion single screw extruder with a 3:1 compression ratio screw and an 8 inch (20.3 cm) coathanger die:

Zone 1: 200° C.
Zone 2: 200° C.
Zone 3: 200° C.
Die: 200° C.
Screw Speed: 52 rpm
Die Press. 2590 psig (36,800 kg/cm²)
Motor Load: 13.5 amps The film was smooth, clear, and free of gels. The Vinex 2034 film at 1.5 mil thickness was then heat laminated at 130°–140° C. to Belland 2620 polymer film (1.5 mils).

EXAMPLE 2

Vinex 1003 resin, a 98–99 mole % hydrolyzed thermoplastic PVOH having a DPn of 750, was extrusion blown into a film in a 1 inch (2.54 cm) Killion single screw extruder. The extruder was 24:1 L/D with a 3:1 compression ratio screw. The extrusion conditions were as follows:

Zone 1: 225° C.
Zone 2: 220° C.
Zone 3: 215° C.
Adaptor: 210° C.
Die: 220° C.
Screw Speed: 40 rpm
Die Press. 1010 psig (14,400 kg/cm²)
Motor Load: 14 amps The film was smooth, with a slight haze indicative of crystallization and therefore, cold water resistant and free of gels. The Vinex 1003 film at 1.5 mil thickness was then heat laminated to Vinex 2034 film (1.5 mils) and Belland 2620 film (1.5 mils) in such an order as to provide Belland resin as the inner layer, Vinex 2034 resin as the middle layer and Vinex 1003 resin as the outside layer.

EXAMPLE 3

Film samples of the multilayer structures of Examples 1 and 2 were converted to pouches using an impulse heat sealer. The pouches were then filled with concentrated laundry detergent and evaluated for caustic stability and water solubility by storing at 50% R.H. and 75° F (24° C.) for a period of 14 days. After the 14 days of storage the pouches appeared unchanged. The pouches were then placed with slow agitation in 500 ml water at the temperature indicated in Table 1. The times required for opening and total solubility of the film are presented in Table 1 showing seconds for the pouch to open and minutes for it to dissolve.

TABLE 1

| Film | Sec. to Open 120° F. | Min. To Dissolve 120° F. | Sec. to Open 50° F. | Min. to Dissolve 50° F. |
| --- | --- | --- | --- | --- |
| Ex 1 | — | — | 30 | 3 |
| Ex 2 | 35 | 4 | — | — |
| Vinex 2034 | — | — | 180 | large pieces undissolved |

Statement of Industrial Application

The present invention provides a multilayer water soluble structure that is suitable for packaging caustic compositions such as laundry detergents.

We claim:

1. A multilayer structure consisting essentially of a first layer consisting of a water insoluble thermoplastic acid functional polymer which is soluble in aqueous alkaline medium and is selected from the group consisting of a copolymer of an alkyl (meth)acrylate and a (meth)acrylic acid, a copolymer of ethylene and acrylic acid, and a copolymer of styrene and maleic anhydride and a second layer consisting of a partially hydrolyzed, thermoplastic polyvinyl alcohol.

2. The multilayer structure of claim 1 in which the acid functional polymer is a copolymer of alkyl (meth)acrylates and methacrylic acid.

3. The multilayer structure of claim 1 in which the partially hydrolyzed polyvinyl alcohol is 75 to 90 mole % hydrolyzed and has a degree of polymerization in the range of 200 to 2500.

4. The multilayer structure of claim 1 further comprising a third layer of a fully hydrolyzed, thermoplastic polyvinyl alcohol.

5. The multilayer structure of claim 4 in which the fully hydrolyzed polyvinyl alcohol is 95 to 99+ mole % hydrolyzed and has a degree of polymerization in the range of 200 to 2500.

6. A multilayer structure consisting essentially of a first layer consisting of a water insoluble thermoplastic acid functional polymer which is soluble in aqueous alkaline medium and is a copolymer of alkyl (meth)acrylate and (meth)acrylic acid and a second layer consisting of a thermoplastic polyvinyl alcohol which is 75 to 90 mole % hydrolyzed and has a degree of polymerization in the range of 200 to 2500.

7. The multilayer structure of claim 6 in which the polyvinyl alcohol is 86 to 89 mole % hydrolyzed.

8. The multilayer structure of claim 6 further comprising a third layer of a thermoplastic polyvinyl alcohol which is 95 to 99+ mole % hydrolyzed and has a degree of polymerization In the range of 200 to 2500.

9. The multilayer structure of claim 8 in which the polyvinyl alcohol of the third layer is 98 to 99+ mole % hydrolyzed.

10. A multilayer structure consisting essentially of a first layer consisting of a water insoluble thermoplastic acid functional polymer which is soluble in aqueous alkaline medium and is a copolymer of alkyl (meth)acrylate and (meth)acrylic acid, a second layer consisting of a thermoplastic polyvinyl alcohol which is 86 to 89 mole % hydrolyzed and has a degree of polymerization in the range of 200 to 2500, and a third layer consisting of a thermoplastic polyvinyl alcohol which is 98 to 99+ mole % hydrolyzed and has a degree of polymerization in the range of 200 to 2500.

11. The multilayer structure of claim 1 which is a film.

12. The multilayer structure of claim 2 which is a film.

13. The multilayer structure of claim 3 which is a film.

14. The multilayer structure of claim 4 which is a film.

15. The multilayer structure of claim 5 which is a film.

16. The multilayer structure of claim 6 which is a film.

17. The multilayer structure of claim 7 which is a film.

18. The multilayer structure of claim 8 which is a film.

19. The multilayer structure of claim 9 which is a film.

20. The multilayer structure of claim 10 which is a film.

21. A package containing alkaline material and formed from the film of claim 11.

22. A package containing alkaline material and formed from the film of claim 12.

23. A package containing alkaline material and formed from the film of claim 14.

24. A package containing alkaline material and formed from the film of claim 16.

25. A package containing alkaline material and formed from the film of claim 18.

26. A package containing alkaline material and formed from the film of claim 20.

27. The multilayer structure of claim 2 in which the acid functional copolymer is a butyl methacrylate/ethyl acrylate/methacrylic acid terpolymer.

28. The multilayer structure of claim 6 in which the acid functional copolymer is a butyl methacrylate/ethyl acrylate/methacrylic acid terpolymer.

29. The multilayer structure of claim 10 in which the acid functional copolymer is butyl methacrylate/ethyl acrylate/methacrylic acid terpolymer.

* * * * *